INVENTOR.
MORTON H. LEWIN
BY John V. Regan
ATTORNEY

INVENTOR.
MORTON H LEWIN
BY John V. Regan
ATTORNEY

United States Patent Office 3,230,385
Patented Jan. 18, 1966

3,230,385

UNIDIRECTIONAL SIGNAL PROPAGATION CIRCUIT INCLUDING NEGATIVE RESISTANCE ELEMENTS

Morton H. Lewin, Princeton, N.J., assignor to Radio Corporation of America, a corporation of Delaware Filed Nov. 27, 1959, Ser. No. 855,611
19 Claims. (Cl. 307—88.5)

The present invention relates generally to negative resistance diodes. More specifically, the invention relates to a circuit for connecting a number of negative resistance diodes in cascade in such manner that the diodes propagate a signal in one direction only.

A conventional, three terminal, active element such as a transistor, tube or the like is unilateral. A signal applied to the control electrode (base in the case of the transistor) appears in amplified form at the output electrode (normally the collector in the case of a transistor). There is sufficient isolation between the control electrode and the output electrode so that the amplified signal does not propagate in the backward direction.

A type of negative resistance diode known as a "tunnel diode" has recently assumed considerable interest. Such diodes and some uses for them are described in an article by Sommers in the Proceedings of the IRE, July 1959, page 1201. The diode has a number of important advantages including, for example, low power dissipation, high frequency capability, small size, two stable state operation, and, in production quantities, low cost. The diode also has a major disadvantage in certain applications, namely bilateral signal propagation. The input terminal of the diode is common with its output terminal and any voltage appearing at this common terminal can propagate in either the forward or the backward direction. For example, if an input stage switches a tunnel diode from its low voltage state to its high voltage state and the input stage subsequently assumes a lower voltage value than the common input-output terminal of the diode, the output signal of the diode propagates back toward the input stage.

The general object of the present invention is to provide new and improved tunnel diode circuits in which an input signal propagates in one direction only.

The circuit of the present invention includes three terminals, one an input terminal, one an output terminal, and a third, common terminal. A negative resistance diode which is capable of assuming one of two stable voltage states is connected between the output terminal and the common terminal. A circuit element which is always maintained at a voltage higher than that of the diode regardless of the state of the diode is connected between the input terminal and the common terminal. This element may be, for example, a conventional positive resistance diode, a negative resistance diode which is maintained always in its high state or other means discussed later. An impedance element such as a resistor connects the input and output terminals.

The input signal to the three terminal network may be taken from across a circuit which includes an impedance element, such as a resistor, in series with a driver negative resistance diode which can assume one of two stable voltage states. The parameters of the series circuit are such that the voltage across it when the driver diode is in the lower of its two voltage states is approximately equal to that of the input terminal of the three terminal network.

In operation, when the driver diode in the series circuit is in the lower of its two voltage states, substantially no current flows from the input terminal of the three terminal network back towards the series circuit since the voltage across the series circuit is approximately equal to that at the input terminal. Nor does any current flow from the output terminal of the three terminal network back towards the input terminal since the latter is at a higher voltage than the former. When the driver diode is in the higher of its two voltage states, current flows from the series circuit through a coupling element such as a resistor to the input terminal, and a portion of this current flows from the input terminal to the output terminal. The total current flow from the input terminal to the output terminal may be sufficient to switch the negative resistance diode connected to the output terminal to the higher of its two voltage states. But, the voltage at the input terminal continues to be at substantially the same value as when the output diode was in the low voltage state so that the switching of the output diode does not appreciably change the current in the coupling element between the driver diode and the input terminal regardless of which state the driver diode is in.

The invention will be described in greater detail by reference to the following description taken in connection with the accompanying drawing in which.

Figure 1:
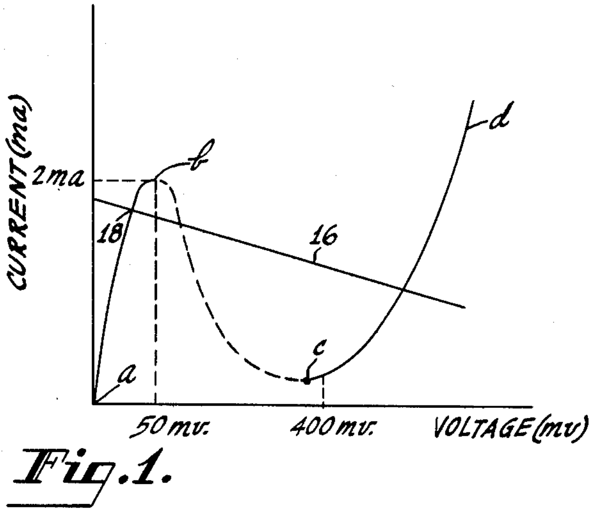
FIG. 1 is a characteristic curve of current versus voltage for a negative resistance diode.

The brief review which follows, of characteristics of negative resistance diodes of importance in the present invention, may help the reader better to understand the invention. FIG. 1 should be referred to first. It is a characteristic curve of current versus voltage for a negative resistance diode. The particular diode illustrated has a current peak *b* of about 2 milliamperes. This is merely illustrative as the current peak depends upon the way in which the diode is made (amount of doping, for example) and may be quite different from 2 milliamperes in other diodes. The peak *b* occurs at a voltage of about 50 millivolts.

Figure 2:
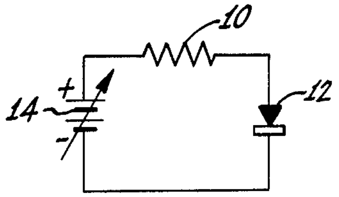
FIG. 2 is a simple circuit for explaining the curve of FIG. 1.

The portions *ab* and *cd* of the curve of FIG. 1 may be obtained with a circuit like the one shown in FIG. 2. It includes a resistor 10 in series with a negative resistance diode 12 and a source of voltage 14 connected across the series circuit. It may be assumed for the purposes of the present discussion that the value of resistance 10 is many times higher than that of diode 12 so that the source 14 and resistor 10 together act substantially like a constant current source. If the current through the diode 12 is varied as, for example, by varying the source voltage 14 first in the positive and then in the negative directions, the curve shown in solid lines of FIG. 1 is obtained. The portions *ab* and *cd* of the curve are regions of positive resistance. In other words, the inverse of the slope, $dE/dI$, is a positive quantity. The region *bc* of the curve is not observable using the plotting technique described and is therefore shown by dashed line. Nevertheless, the region *bc* is known to have a slope such as shown and is accordingly termed a negative resistance region.

The load line 16 for the circuit is almost parallel to the voltage axis and is therefore sometimes termed a constant current load line. Assume the circuit to be quiescently operating at the intersection 18 of the load line and the positive resistance region *ab*. If the current through the circuit is increased to a value beyond that represented by point *b*, the diode rapidly switches to the high voltage state and operates at the point represented by the intersection of the shifted load line 16 and the positive resistance region *cd*. Conversely, if after the diode is in the high voltage state *cd*, the current through the diode is reduced to a value lower than that represented by point *c*, the diode switches back to its low voltage state *ab*.

The two stable state characteristic described above is important in computer applications. The low voltage state of the diode may, for example, represent a binary digit of one type such as binary zero and the high voltage state of the diode a binary of the other type, such as binary one.

Figures 3, 4:
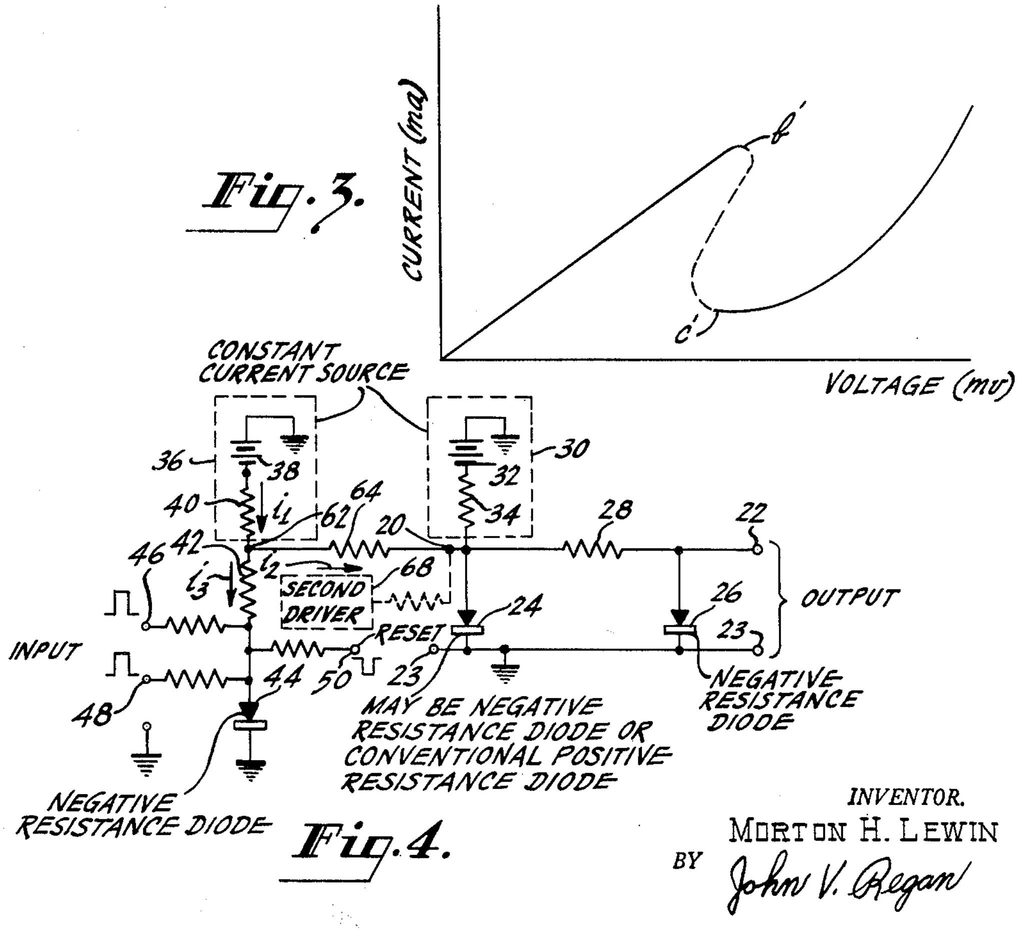
FIG. 3 is a characteristic curve of current versus voltage for the series circuit of a negative resistance diode and resistor.
FIG. 4 is a schematic circuit diagram of a preferred embodiment of the present invention.

If in the circuit of FIG. 2, the diode is replaced by a resistance in series with a negative resistance diode, and the characteristic curve of current versus voltage is plotted for this series circuit, the graph of FIG. 3 is obtained. Again, only the regions *a'b'* and *c'd'* are observable with the technique described so that region *b'c'* is shown by dashed line. It may be noted that the entire curve of FIG. 1 is tilted. The size of the negative resistance operating region is reduced and appears only close to the current peak *b'* and the current valley *c'*. The precise shape of the curve depends in each case upon the specific negative resistance diode employed and the value of resistance. The smaller the value of resistance, the closer the curve is to the one of FIG. 1 and the greater the value of resistance, the more the curve is tilted and the more the negative resistance region is reduced.

The circuit of the present invention is illustrated in FIG. 4. One portion of the circuit includes three terminals—an input terminal 20, an output terminal 22, and a third terminal 23 which is common both to the input and output circuits. A first diode 24 which may be a conventional positive resistance diode or a negative resistance diode is connected between input terminals 20, 23, and a negative resistance second diode 26 is connected between output terminals 22, 23. Terminals 20 and 22 are connected by a bidirectional impedance element such as resistor 28. A constant current source 30 consisting of a source of voltage 32 and a relatively large value of resistance 34 is connected to the anode of diode 24.

The driver circuit for the three terminal network above includes a constant current source 36 which, like source 30, includes voltage source 38 in series with a relatively large value of resistance 40. The constant current source 36 is connected to a resistor 42 which is in series with a negative resistance third diode 44. It may be assumed for the present that diode 44 is in an "or" circuit. An input pulse applied either to terminal 46 or to terminal 48 is of sufficient amplitude to switch diode 44 from its low voltage state to its high voltage state. The diode 44 may be reset once each operating cycle by a negative pulse applied to terminal 50.

Figure 5:
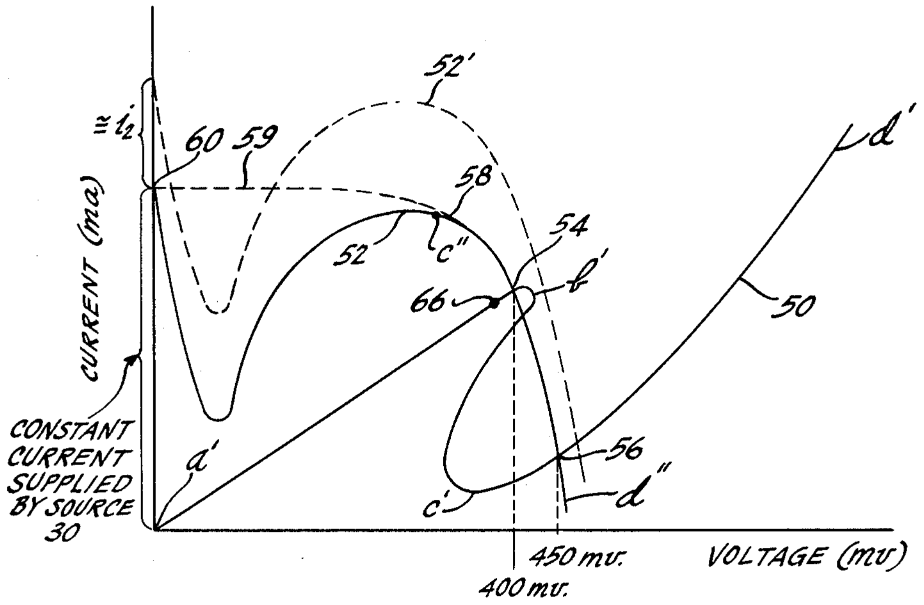
FIG. 5 is a characteristic curve of current versus voltage for a portion of the circuit of FIG. 4.

The operation of the circuit of FIG. 4 may be understood by referring to FIG. 5. The current versus voltage characteristic for resistor 28 in series with diode 26 is as shown at 50. Diode 24 is assumed to be a negative resistance diode for purposes of the present explanation. It may be thought of as a load across the series circuit 28, 26 and its characteristic plotted on the same axis may be as shown at 52. It will be observed that this is a current versus voltage characteristic such as shown in FIG. 1, turned on its back. The constant current source 30 supplies a current to diode 24 at an amplitude sufficient always to maintain diode 24 in its high voltage state.

For the purposes of the present explanation, assume the diode 26 initially to be in its low voltage state. The low voltage state for diode 26 is the portion *a'b'* of curve 50. The high voltage state of diode 24 is represented by the portion *c''*, *d''* of curve 52. Note that *c''*, *d''* is substantially parallel to the current axis and may therefore be thought of as a constant voltage load line for the series circuit of diode 26 and resistor 28. The two curves 50 and 52 intersect at operating point 54 which is at a voltage of about 400 millivolts.

Assume now that the current applied to input terminal 20 is increased. This may be represented in FIG. 5 by an upward shift of the characteristic curve 52. If the current is increased sufficiently, curve 52 shifts to the position indicated by dashed curve 52'. In other words, the effective load line represented by diode 24 no longer intersects operating region *a'b'* of the characteristic 50. The shifted load line does, however, intersect the positive resistance region *c'd'* of curve 50 so that diode 26 switches to its high voltage state. If the current through diode 24 is subsequently decreased to the value indicated by the intersection of curve portion *c''–d''* with curve portion *c'd''*, that is, intersection 56, the voltage at terminal 20 decreases to 450 millivolts.

It may be observed that the voltage at terminal 22 is always less than the voltage at terminal 20 regardless of whether diode 26 is in its high voltage state or in its low voltage state. Thus, any signal applied to terminal 20 can propagate only in the forward direction, that is, in the direction of the output terminal 22 and any signal appearing at terminal 22 cannot propagate backward toward terminal 20. This circuit, in other words, is unilateral.

It has been previously mentioned that diode 24 may be either a negative resistance diode or a conventional positive resistance diode. If the latter, the operation of the circuit is substantially the same as that described above. The load line formed by the positive resistance diode simulates a constant voltage load line just like the load line provided by a negative resistance diode 24. In other words, the region from 54 to *d''* (FIG. 5) is substantially parallel to current axis. The actual shape of the load line for a positive resistance diode 24 extends from beyond *d''* to 58 and then along the dashed line 59 which extends from 58 to 60. It may be observed that this curve is the inverted characteristic for a conventional positive resistance diode.

It may further be pointed out that in other forms of the invention the constant voltage load line 54–*d''* may be simulated by other means. As one example, a resistor may be substituted for diode 24 provided that the resistor is of relatively low value—of the order of several ohms, for example, and driven from a constant current source supplying a relatively large current. As another example, a constant voltage source supplying a voltage of the order of 400 millivolts and having a small internal impedance may be placed across terminals 20 and 23, and constant current source 30 eliminated.

In the circuit just described, input terminal 20 is always maintained at close to the same voltage, the range of variation being from about 400–450 millivolts. The signal propagates from terminal 20 to terminal 22. There remains the problem of preventing a signal from propagating from terminal 20 back toward the driver circuit. This problem is solved in the present invention by maintaining terminal 62 of the driver circuit at a potential which never reduces to a value which is much less than that at terminal 20. The driver includes the resistor 42 in series with negative resistance diode 44. The value of resistance 42 is so chosen that the voltage at point 62 is close to 400 millivolts when diode 44 is in its low state. Thus, when diode 44 is in its low state, the potentials at points 62 and 20 are substantially the same and little or no current flows through coupling resistor 64. When diode 44 is in its high state, the potential of point 62 sharply increases and a signal propagates in the direction from terminal 62 towards terminal 20. Thus, regardless of the states of diodes 44, 24, or 26, an input signal applied to terminals 46 or 48 propagates only in one direction and appears at output terminal 22.

The circuit including negative resistance diode 44 may provide any one of a number of logic functions. For example, the quiescent current through the diode may be adjusted to a value such that either a pulse applied to input terminal 46 or a pulse applied to input terminal 48 switches the diode from its low voltage state to its high voltage state. In this mode of operation the circuit acts as an "or" circuit as already described. In another mode of operation, the quiescent current through the diode 44 may be adjusted to a value such that concurrent pulses applied to terminals 46 and 48 respectively are required to switch the diode 44 from its low state to its high state. In this mode of operation, diode 44 acts like an "and" circuit. In this same mode of operation, three, four, or more input pulses may be required to switch the diode from one stable state to the other. Only two inputs to the diode are shown but it is to be understood that in an *n* input "and" gate, *n* input connections are required. In a third mode of operation, the concurrence of *m* out of *n* inputs may be required to switch diode 44—a so-called "majority gate." In any of these operating modes, after each cycle of operation, the diode may be reset to its low state by a reverse bias pulse applied to terminal 50.

For the purposes of the present explanation, a single driver is shown connected to the three terminal network. The quiescent current through diode 24 is such that switching of diode 44 from its low voltage state to its high voltstate causes diode 26 to switch from its low voltage state to its high state. It is to be understood that a smaller quiescent current may be applied to diode 24 so that the operating point is, for example, at 66 in FIG. 5. It now requires more than a single input to switch diode 26. Thus, the three terminal network can be made to perform the "and" function or the "majority" gate function described above. A second driver circuit or more than one other driver circuit may be connected to terminal 20 so that concurrent pulses may be applied to this terminal for switching diode 26. A second driver is shown schematically in FIG. 4 by dashed block 68.

The reset circuit for diode 26 is not shown in FIG. 4 but may be similar to the one shown for diode 44.

A typical circuit such as shown in FIG. 4 may have the following circuit values.

| | |
|---|---|
| Resistor **40** | 3,900 ohms. |
| Resistor **42** | 150 ohms. |
| Resistor **64** | 470 ohms. |
| Resistor **34** | 3,000 ohms. |
| Resistor **28** | 160 ohms. |
| Diodes **44**, **24**, and **26** | Current peaks *b* (FIG. 1) at about 2½ milliamperes and 50 millivolts; Current valleys (see FIG. 1) about 400 millivolts. |

The voltages and currents at various points in the circuit may be calculated as follows:

$i_1$=2.5 milliamperes (given)

$V_{44}$ (in low state)=50 millivolts $V_{62}$=50 mv.+150 Ω (2.5 ma.)=425 mv. (assuming negligible current flow through resistor 64. Actual current flow through resistor 64 can be calculated and is so small it may be ignored in the present calculations).

From the above, it may be seen that the voltage at point 62, when diode 44 is in its low state, is slightly higher than the voltage at point 20 and current propagates from terminal 62 to terminal 20. The circuit would be equally operative if the voltage at terminal 62 were slightly less than that at terminal 20. In either case, the voltage drop between terminals 62 and 20 would be extremely small and negligible current would flow. Put another way, any backward current which flowed under these conditions would be insufficient appreciably to affect the circuit driving terminal 20.

When diode 44 is in its high state, the voltage at terminal 62 switches to a value substantially higher than 425 millivolts and an appreciable amount of current $i_2$ flows through coupling resistor 64. The various current and voltage values may be calculated as follows:

$$i_2+i_3 \cong 2.5 \text{ ma.} \quad (1)$$

$$\frac{V_{62}-400 \text{ mv.}}{470\Omega}=i_2 \quad (2)$$

$$\frac{V_{62}-450 \text{ mv.}}{150\Omega}=i_3 \quad (3)$$

(the current through diode 44 is such that when it switches to the high state its voltage is about 450 mv.)

Adding Equations 2 and 3 and substituting 2.5 milliamperes for $i_2+i_3$ gives the following:

$$V_{62} \cong 720 \text{ mv.};\ i_2 \cong 0.7 \text{ ma.};\ i_3 \cong 1.8 \text{ ma.} \quad (4)$$

It may be observed from calculations above that when diode 44 is in its high state, an appreciable amount of current flows from terminal 62 to terminal 20. The effect of this additional current flow is to increase the voltage across diode 24 from about 400 millivolts to about 450 millivolts. This shifts the diode 24 characteristic of FIG. 5 from curve 52 to curve 52' so that there is no longer any stable intersection between characteristic 52' and the low voltage region *a'b'* of curve 50. Accordingly, diode 26 switches from its low voltage state of about 40 to 45 millivolts or so to its high voltage state of about 400 millivolts. This change in voltage reduces $i_2$ slightly and increases $i_3$ correspondingly.

What is claimed is:

1. A three terminal network comprising, in combination, a negative resistance diode which may be switched from one voltage state to another connected between the second and third of said terminals; a circuit element connected between the first and third of said terminals; means coupled to said circuit element for always maintaining said element at an approximately constant voltage higher than that across said negative resistance diode; and a direct current, bilateral, coupling element connected between said first and second terminals.

2. A three terminal network as set forth in claim 1, wherein said circuit element comprises a diode.

3. A three terminal network as set forth in claim 1, wherein said circuit element comprises a second negative resistance diode which is capable of assuming a high or a low voltage state and means for maintaining said second diode always in its high state, like electrodes of said two diodes being connected to said third terminal.

4. In combination, a first impedance element; means coupled to said element for always maintaining the same at a substantially constant voltage; a negative resistance diode which can assume a high or a low voltage state and a resistor connected in series, the value of said resistor being such that the voltage appearing across the series circuit when the negative resistance diode is in its low voltage state is approximately equal to said constant voltage; and an impedance element connecting said series circuit to said first impedance element at the points which are at substantially equal values of voltage when the negative resistance diode is in its low voltage state, whereby substantially no current flows through said impedance element when said negative resistance diode is in its low voltage state.

5. In a three terminal network which includes an input terminal, an output terminal, and a common third terminal, in combination, a negative resistance first diode connected between said output and common terminals and having two stable voltage states; a second diode connected between said input and common terminals, like elements of the two diodes being connected to said common terminal, said second diode having a substantially constant voltage operating region at a value of voltage greater than that of the lower of the two stable voltage states of said first diode; a bidirectional impedance means connected between said input and output terminals; and a constant current source connected to said input terminal for supplying a value of current sufficient to place said second diode in its substantially constant voltage operating region but insufficient to switch the first diode to the higher of its two voltage states in the absence of an input signal applied between said input and common terminals, for always maintaining the voltage at said input terminal at a substantially constant value greater than that at said output terminal.

6. In a three terminal network which includes an input terminal, an output terminal, and a common third terminal, in combination, a negative resistance first diode which is capable of assuming one of two stable voltage states connected between said output and common terminals; a negative resistance second diode which is capable of assuming one of two voltage states connected between said input and common terminals, like elements of said two diodes being connected to said common terminal; a resistor directly connecting said input and output terminals; and a constant current source connected to said input terminal for supplying a value of current sufficient always to maintain said second negative resistance diode in the higher of its two voltage states but insufficient, in the absence of an input signal applied between said input and common terminals, to switch the first negative resistance diode to the higher of its two voltage states.

7. A unilateral circuit comprising, in combination, an input terminal; an output terminal; a common third terminal; a negative resistance first diode which is capable of assuming one of two stable voltage states connected between said output and said common terminals; a first impedance means connected between said input and common terminals; a bidirectional second impedance means connected between said input and output terminals; a source connected to said input terminal for always maintaining the voltage at said input terminal at a value higher than that at said output terminal; a negative resistance second diode, like electrodes of said second and first diodes being connected to said common terminal; a third impedance means connected to the other electrode of said second diode and forming a series circuit with said second diode; a constant current source connected across said series circuit, the value of said third impedance means and the constant current supplied by said source being such that the voltage across said series circuit is approximately equal to the voltage at said input terminal when said second diode is in the lower of its two voltage states; and a bidirectional impedance element connecting said input terminal across said series circuit.

8. A unilateral circuit as set forth in claim 7, further including means for applying pulses to said second diode for switching the same from one stable voltage state to another.

9. A unilateral circuit as set forth in claim 7, wherein said second impedance means comprises a third diode.

10. A unilateral circuit as set forth in claim 7, wherein said second impedance means comprises a negative resistance third diode, like electrodes of said third and first diodes being connected to said common terminal.

11. In combination, a tunnel diode driver stage which is capable of assuming a high or a low voltage state; means for deriving an elevated output voltage from said driver stage; a tunnel diode receiver stage which is capable of assuming a high or a low voltage state; and means for coupling said two tunnel diode stages comprising means maintained at a substantially constant voltage somewhat greater than that of the high state of the tunnel diode receiver stage, and bilateral, direct-current, coupling elements, one connecting the elevated output of said tunnel diode driver stage to said means for coupling and another connecting said means for coupling to said tunnel diode receiver stage.

12. In the combination as set forth in claim 11, said means for coupling said two tunnel diode stages comprising a positive resistance diode.

13. In the combination as set forth in claim 11, said means for coupling said two tunnel diode stages comprising a third tunnel diode which is capable of assuming a high or a low voltage state, and a current source supplying current to the diode at a level always to maintain the diode in its high state.

14. In the combination as set forth in claim 11, said bilateral, direct-current, coupling elements comprising resistors.

15. A three terminal network as set forth in claim 1, wherein said circuit element comprises solely a positive resistance diode.

16. A three terminal network as set forth in claim 1, wherein said circuit element consists solely of a single diode and further including a current source coupled to the single diode and supplying a current thereto at a level such that said single diode is operating beyond the knee of its characteristic in its substantially constant voltage operating region.

17. A three terminal network comprising, in combination, a tunnel diode which may be switched from one voltage state to another connected between the second and third of said terminals; a second tunnel diode connected between the first and third of said terminals; means coupled to said second tunnel diode for always maintaining the same in its high voltage state; and a direct current bi-lateral coupling element connected between said first and second terminals.

18. In a circuit comprising a tunnel diode exhibiting a potential-current characteristic defining a first region of positive resistance over a low range of potentials and adjoining at a peak current value a second region of negative resistance and thence a third region of positive resistance, load means connected in parallel with said diode exhibiting a non-linear impedance characteristic including a relatively constant value of resistance for a predetermined range of potential and a current source for energizing said circuit effective to cause intersection of said characteristics in the first and third regions of said diode characteristic, said load means including a diode which exhibits only a positive resistance.

19. The circuit of claim 18 including information input means for selectively energizing said circuit with a current inpulse in conjoint operation with said current source to cause intersection of said characteristics in said third region only.

References Cited by the Examiner

UNITED STATES PATENTS

| | | | |
|---|---|---|---|
| 2,585,571 | 2/1952 | Mohr | 307—88.5 |
| 2,944,164 | 7/1960 | Odell et al. | 307—88.5 |
| 2,966,599 | 12/1960 | Haas | 307—88.5 |
| 2,997,604 | 8/1961 | Shockley | 307—88.5 |
| 3,019,981 | 2/1962 | Lewin | 307—88.5 |
| 3,062,971 | 11/1962 | Wallace | 307—88.5 |
| 3,075,088 | 1/1963 | Li | 307—88.5 |

DAVID J. GALVIN, *Primary Examiner.*

GEORGE N. WESTBY, JOHN W. HUCKERT, ARTHUR GAUSS, *Examiners.*